(12) United States Patent
He

(10) Patent No.: US 9,001,940 B2
(45) Date of Patent: Apr. 7, 2015

(54) FREQUENCY OFFSET ACQUISITION METHOD AND APPARATUS THEREOF

(75) Inventor: Wei-Hung He, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 576 days.

(21) Appl. No.: 12/759,679

(22) Filed: Apr. 13, 2010

(65) Prior Publication Data

US 2010/0266076 A1    Oct. 21, 2010

(30) Foreign Application Priority Data

Apr. 15, 2009 (TW) .............................. 98112495 A

(51) Int. Cl.
  *H04L 27/06* (2006.01)
  *H04L 27/26* (2006.01)
(52) U.S. Cl.
  CPC ........ H04L 27/2657 (2013.01); H04L 27/2676 (2013.01); H04L 27/2613 (2013.01)
(58) Field of Classification Search
  USPC ........................................................ 375/244
  See application file for complete search history.

(56) References Cited

U.S. PATENT DOCUMENTS

| | | | | | |
|---|---|---|---|---|---|
| 3,629,837 | A | * | 12/1971 | Fraunfelder et al. | 375/275 |
| 4,121,295 | A | * | 10/1978 | Witt | 708/493 |
| 4,517,519 | A | * | 5/1985 | Mukaiyama | 329/303 |
| 5,430,759 | A | * | 7/1995 | Yokev et al. | 375/133 |
| 6,052,410 | A | * | 4/2000 | Okita | 375/222 |
| 6,961,314 | B1 | * | 11/2005 | Quigley et al. | 370/252 |
| 6,965,616 | B1 | * | 11/2005 | Quigley et al. | 370/480 |
| 7,031,886 | B1 | * | 4/2006 | Hargreaves | 702/191 |
| 7,120,123 | B1 | * | 10/2006 | Quigley et al. | 370/252 |
| 7,317,309 | B2 | * | 1/2008 | Yamaguchi et al. | 324/76.19 |
| 7,474,611 | B2 | * | 1/2009 | Svensson et al. | 370/208 |
| 7,519,097 | B2 | * | 4/2009 | Oishi et al. | 375/130 |
| 7,602,856 | B2 | * | 10/2009 | Wagner et al. | 375/295 |
| 7,668,273 | B2 | * | 2/2010 | Paul et al. | 375/354 |
| 7,696,925 | B2 | * | 4/2010 | Brenner | 342/357.48 |
| 7,787,513 | B2 | * | 8/2010 | Siwiak et al. | 375/130 |
| 7,843,847 | B2 | * | 11/2010 | Quigley et al. | 370/252 |
| 7,983,310 | B2 | * | 7/2011 | Hirano et al. | 370/525 |
| 8,059,767 | B2 | * | 11/2011 | Furman et al. | 375/344 |
| 2002/0137464 | A1 | * | 9/2002 | Dolgonos et al. | 455/60 |
| 2004/0131032 | A1 | * | 7/2004 | Sendonaris et al. | 370/335 |
| 2004/0247017 | A1 | | 12/2004 | Hofmann | |
| 2005/0009471 | A1 | * | 1/2005 | Paul et al. | 455/62 |
| 2005/0117679 | A1 | * | 6/2005 | Paul et al. | 375/354 |
| 2006/0165128 | A1 | * | 7/2006 | Peake et al. | 370/503 |
| 2007/0140104 | A1 | * | 6/2007 | Lim et al. | 370/208 |
| 2008/0002566 | A1 | | 1/2008 | Zhang | |
| 2008/0158050 | A1 | * | 7/2008 | Levy | 342/357.02 |
| 2008/0205544 | A1 | * | 8/2008 | Berens | 375/285 |

(Continued)

FOREIGN PATENT DOCUMENTS

| | | |
|---|---|---|
| CN | 1677911 | 10/2005 |
| CN | 101132385 A | 2/2008 |

*Primary Examiner* — Santiago Garcia
(74) *Attorney, Agent, or Firm* — Birch, Stewart, Kolasch & Birch, LLP

(57) ABSTRACT

A frequency offset acquisition method includes: receiving a specific sequence signal transmitted through a channel; shifting a frequency of the specific sequence signal at a plurality of different frequencies in frequency domain to thereby generate a plurality of shifted sequence signals respectively; and determining an estimated frequency offset value between a transmitter and a receiver according to the shifted sequence signals.

19 Claims, 5 Drawing Sheets

(56) References Cited

U.S. PATENT DOCUMENTS

| | | | |
|---|---|---|---|
| 2009/0154601 A1* | 6/2009 | Furman et al. | 375/324 |
| 2009/0207944 A1* | 8/2009 | Furman et al. | 375/329 |
| 2009/0292507 A1* | 11/2009 | Nee et al. | 702/189 |
| 2010/0066495 A1* | 3/2010 | Malocha et al. | 340/10.1 |
| 2010/0171659 A1* | 7/2010 | Waters et al. | 342/357.12 |

* cited by examiner

FREQUENCY OFFSET ACQUISITION METHOD AND APPARATUS THEREOF

BACKGROUND OF THE INVENTION

1. Field of the Invention

The present invention relates to a method and an apparatus of frequency offset acquisition, and more particularly, to a method and an apparatus of determining an estimated frequency offset through shifting a frequency of a sequence signal by a plurality of different frequencies in the frequency domain.

2. Description of the Prior Art

For a communication system utilizing time domain synchronous orthogonal frequency division multiplexing (TDS-OFDM), there usually exists a carrier frequency offset between a transmitter and a receiver. In conventional systems, the frequency offset estimation is usually performed through a specific pseudorandom noise sequence (PN sequence) signal utilized in the TDS-OFDM modulation, and then a frequency offset of discrete Fourier transformed (DFT) data is adjusted or compensated through using a loop filter to control a numerically controlled oscillator (NCO); further details can be found in China Patent Application No. 200410003486 (also published as China Publication No. 1677911). However, the aforementioned compensation method is not suitable for a transmission environment suffering from multipath; this is because the estimated frequency offset derived from the aforementioned method is extremely inaccurate.

SUMMARY OF THE INVENTION

Therefore, one of the objectives of the present invention is to provide a method and related apparatus capable of estimating a reliable frequency offset in a transmission environment suffering from multipath.

According to an embodiment of the present invention, a frequency offset acquisition method is disclosed. The frequency offset acquisition method includes: receiving a specific sequence signal transmitted through a channel, and storing the specific sequence signal in a storage unit; shifting a frequency of the specific sequence signal at a plurality of different frequencies in the frequency domain to thereby generate a plurality of shifted sequence signals, respectively; and determining an estimated frequency offset value between a transmitter and a receiver according to the plurality of shifted sequence signals.

According to another embodiment of the present invention, a frequency offset acquisition apparatus is disclosed. The frequency offset acquisition apparatus includes a receiving unit, a processing unit and a determining unit. The receiving unit is for receiving a specific sequence signal transmitted through a channel. The processing unit is for shifting a frequency of the specific sequence signal at a plurality of different frequencies in the frequency domain to thereby generate a plurality of shifted sequence signals, respectively. The determining unit is for determining an estimated frequency offset value between a transmitter and a receiver according to the plurality of shifted sequence signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
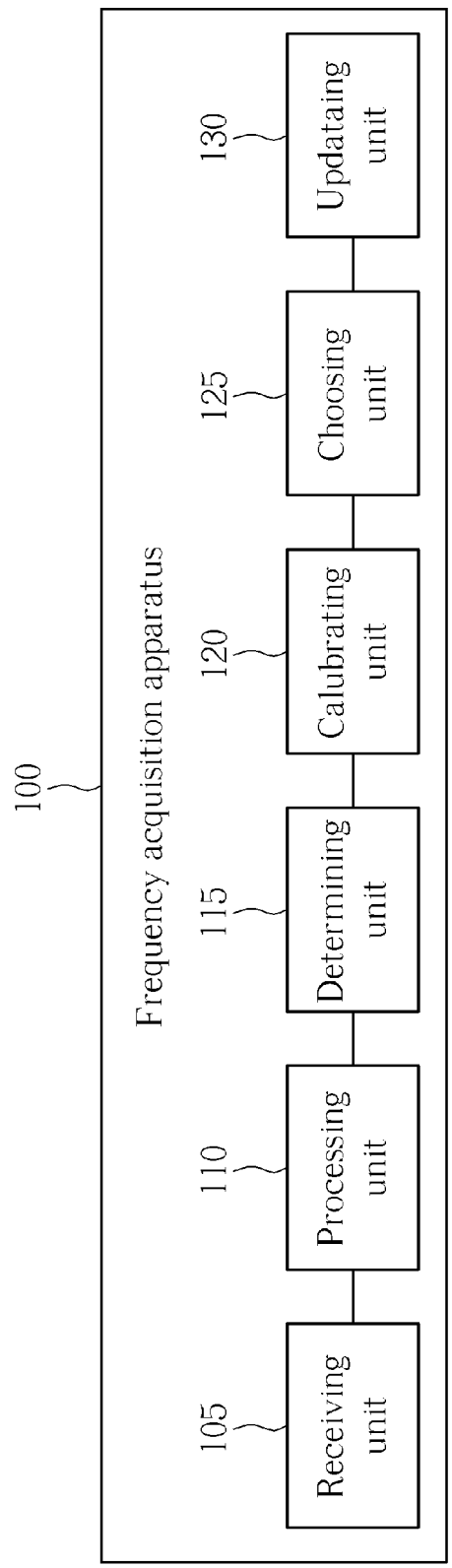
FIG. 1 is a block diagram of a frequency offset acquisition apparatus according to a first embodiment of the present invention.

Please refer to FIG. 1, which is a diagram of a frequency offset acquisition apparatus 100 according to a first embodiment of the present invention. The frequency offset acquisition apparatus 100 includes a receiving unit 105, a processing unit 110, a determining unit 115, a calibrating unit 120, a choosing unit 125 and an updating unit 130. Please note that the frequency offset acquisition apparatus 100 in this exemplary embodiment derives a better estimated frequency offset value through a two-phase operation. In a first phase, a preliminary estimated frequency offset value is derived utilizing the receiving unit 105, the processing unit 110 and the determining unit 115, where this preliminary estimated frequency offset value is capable of minimizing a carrier frequency offset between a receiver and a transmitter within a predetermined frequency range, for example, within 15 kHz. Next, in a second phase following the first phase, the calibrating unit 120, choosing unit 125 and updating unit 130 are utilized to calibrate and fine-tune the preliminary estimated frequency offset value, thereby deriving a finalized better estimated frequency offset value.

Figure 2:
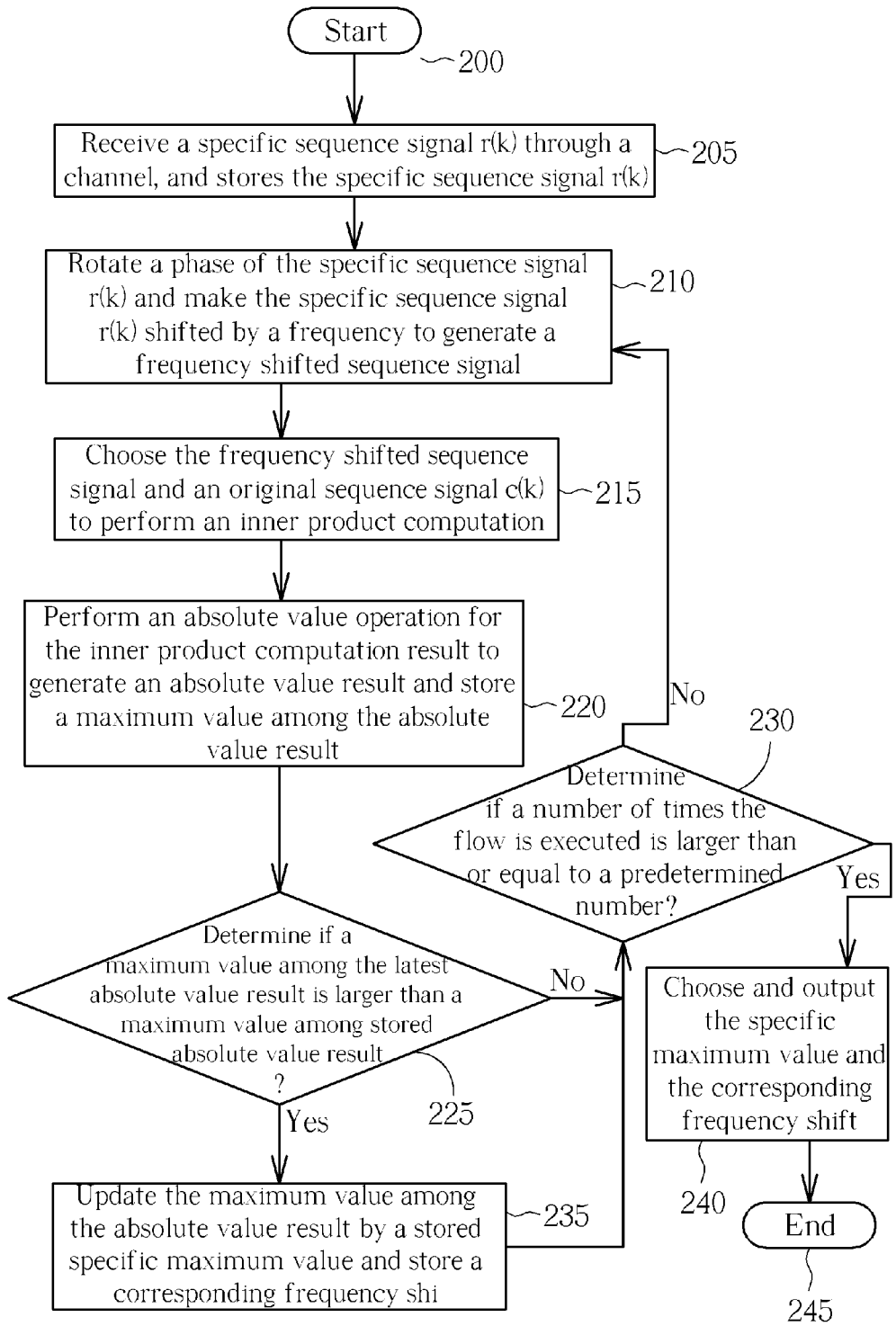
FIG. 2 is a flowchart illustrating an operation of the frequency offset acquisition apparatus shown in FIG. 1 in a first phase.

Please refer to FIG. 2 in conjunction with FIG. 1. FIG. 2 is a flowchart illustrating an operation of the frequency offset acquisition apparatus 100 shown in FIG. 1 in the first phase. If the result is substantially the same, the steps are not required to be executed in the exact order shown in FIG. 2. In addition, the steps in FIG. 2 are not required to be executed sequentially, i.e., other steps can be inserted in between. In step 205, the receiving unit 105 receives a specific sequence signal r(k) transmitted through a channel, and stores the specific sequence signal r(k) in a storage unit (or a memory unit), wherein the specific sequence signal r(k) is a pseudorandom noise sequence (PN sequence). Assuming that the frequency offset acquisition apparatus 100 of the present invention is employed in a communication system complying with a time domain synchronous orthogonal frequency division multiplexing (TDS-OFDM) specification, the specific sequence signal f(k) is thereby a PN sequence adopted in the TDS-OFDM communication system; r(k) can be represented by the following equation:

$$r(k)=[c(k)*h(k)]\cdot e^{j(\Omega kT+\theta)}+n(k) \quad (1)$$

In equation (1), c(k) is an original random sequence signal transmitted by the transmitter, h(k) is a channel parameter, $\Omega kT$ represents a frequency offset due to the channel, and $\theta$ represents a phase shift due to the channel. In step 210, the processing unit 110 rotates a phase of the specific sequence signal r(k), and thereby makes the specific sequence signal r(k) shifted equivalently by a frequency $f_1$ in the frequency domain to generate a frequency shifted sequence signal $r_1(k)$.

$$r_1(k)=[c(k)*h(k)]\cdot e^{j((\Omega-f_1)kT+\theta)}+n(k)\cdot e^{j(-f_1kT+\theta)} \quad (2)$$

In step 215, the determining unit 115 chooses the frequency shifted sequence signal $r_1(k)$ and an original sequence signal c(k) with a length K to perform an inner product computation, where the inner product computation result $R_1(k)$ is indicated by equation (3):

$$R_1(k) = \frac{1}{K}\sum_{n=0}^{K-1} r_1(n) \cdot c*(n-k) \qquad (3)$$

In step 220, the determining unit 115 then performs an absolute value operation for the inner product computation result $R_1(k)$ to generate an absolute value result $|R_1(k)|$, and stores a maximum value $|R_1(k)|_{max}$ among absolute value result $|R_1(k)|$. In step 225, the determining unit 115 will determine whether a maximum value among the latest absolute value result is larger than a maximum value among any previously stored absolute value result. Since there is no stored maximum value before the maximum value $|R_1(k)|_{max}$ is generated, the flow therefore proceeds to step 230, and determines if a number of times the flow is executed is larger than or equal to a predetermined number. Since the flow at this point only generates an absolute value result $|R_1(k)|$, i.e., the flow is only executed once, the flow will thereby proceed to step 210 again. The processing unit 110 will rotate a phase of the frequency shifted sequence signal f(k) to make the frequency shifted sequence signal shifted equivalently by a frequency $f_1-f_2$ in the frequency domain, or directly rotate the phase of the specific sequence signal r(k) to make the specific sequence signal shifted equivalently by a frequency $-f_2$ in the frequency domain, i.e., in equivalence, the processing unit 110 rotates the phase of the specific sequence signal r(k) to make the specific sequence signal shifted equivalently by a frequency $-f_2$ in frequency domain and thereby generates a different frequency shifted sequence signal $r_2(k)$ as shown in equation (4).

$$\begin{aligned} r_2(k) &= r_1(k) \cdot e^{j((f_1-f_2)kT+\theta)} \\ &= [c(k)*h(k)] \cdot e^{j((\Omega-f_2)kT+\theta)} + n(k) \cdot e^{j(-f_2kT+\theta)} \end{aligned} \qquad (4)$$

Next, in step 215, the determining unit 115 will choose the frequency shifted sequence signal $r_2(k)$ and an original sequence signal c(k) with a length K+1 to perform an inner product computation, where the inner product computation result $R_2(k)$ is represented by equation (5):

$$R_2(k) = \frac{1}{K}\sum_{n=0}^{K-1} r_2(n) \cdot c*(n-k) \qquad (5)$$

In step 220 and step 225, the determining unit 115 performs an absolute value operation for the inner product computation result $R_2(k)$ to generate an absolute value result $|R_2(k)|$, stores a maximum value $|R_2(k)|_{max}$ among absolute value result $|R_2(k)|$, and determines whether the maximum value $|R_2(k)|_{max}$ among the latest absolute value result is larger than the maximum value (e.g., $|R_1(k)|_{max}$) among any previously stored absolute value result. For example, if $|R_2(k)|_{max}$ is larger than $|R_1(k)|_{max}$, the flow proceeds to step 235. In step 235, the determining unit 115 will update a stored specific absolute value by $|R_2(k)|_{max}$ (as mentioned above, only $|R_1(k)|_{max}$ is stored, and $|R_1(k)|_{max}$ is the stored specific absolute value), and store the frequency shift corresponding to $|R_2(k)|_{max}$. The flow then proceeds to steps 210-220. The processing unit 110 makes the specific sequence signal r(k) shifted by a different frequency (e.g., $f_3$) again to derive a different frequency shifted sequence signal, and the determining unit 115 performs an inner product computation and an absolute value operation of the frequency shifted sequence signal, and derives a maximum value among an absolute value result. The predetermined number of this embodiment is N; in other words, the processing unit 110 shifts a frequency of the specific sequence signal r(k) by N different frequencies in the frequency domain to thereby generate N shifted sequence signals $r_1(k)-r_N(k)$, respectively; furthermore, the determining unit 115 generates N absolute value results $|R_1(k)|-|R_N(k)|$ according to the shifted sequence signals $r_1(k)-r_N(k)$ and N maximum absolute values $|R_1(k)|_{max}-|R_N(k)|_{max}$ respectively derived from the N absolute value results, and chooses a maximum specific absolute value among maximum absolute values $|R_1(k)|_{max}-|R_N(k)|_{max}$, where a frequency value corresponding to the maximum specific absolute value serves as the preliminary estimated frequency offset value between the transmitter and the receiver.

In addition, the present invention is not limited to generating absolute value results $|R_1(k)|-|R_N(k)|$ according to the inner product computation and the absolute value operation applied to the original sequence signal c(k) and each aforementioned frequency shifted sequence signal. In another embodiment, the absolute value results $|R_1(k)|-|R_N(k)|$ can also be generated from a correlation operation and an absolute value operation applied to the original sequence signal c(k) and each aforementioned frequency shifted sequence signal, which also falls within the scope of the present invention. Specifically, for each frequency shifted sequence signal, the determining unit 115 performs a cyclic correlation operation upon the original sequence signal and the frequency shifted sequence signal to generate an operation result including a plurality of correlation values; and for each operation result, the determining unit 115 performs an absolute value operation of the correlation values included in each operation result to generate a plurality of corresponding absolute values, and chooses a specific absolute value among the absolute values, wherein the specific absolute value is an extreme value among the absolute values. Next, the determining unit 115 determines the preliminary estimated frequency offset value according to an extreme value among a plurality of specific absolute values (i.e., $|R_1(k)|_{max}-|R_N(k)|_{max}$) which correspond to the operation results (i.e., $|R_1(k)|-|R_N(k)|$), respectively. It should be noted that the number of N is not supposed to be a limitation to the scope of the present invention; generally speaking, the value of the predetermined number N can be designed as an integer larger than 2.

After the aforementioned flow is executed N times (i.e. after N frequency shifted sequence signals are generated), step 240 will be executed and the whole process comes to an end in step 245. In step 240, the determining unit 115 chooses and outputs the specific maximum value presently stored and the corresponding frequency shift, where the specific maximum value is a maximum value among N absolute value results $|R_1(k)|_{max}-|R_N(k)|_{max}$ and the corresponding frequency shift is the preliminary estimated frequency offset found in the first phase.

The principle of how the aforementioned flow can estimate the preliminary frequency offset is that: when the processing unit 110 rotates the phase of the specific sequence signal r(k) to make signal r(k) shifted equivalently by a frequency $f_n$ that is close to the actual frequency offset $\Omega$ in frequency domain, the maximum value $|R_n(k)|_{max}$ among the absolute value result $|R_N(k)|$ will be the maximum value among all maximum values $|R_1(k)|_{max}-|R_N(k)|_{max}$. This is because, for normal transmission channels, energy is concentrated in a few paths only (even though the channel is a multipath channel), making $|R_n(k)|_{max}$ be the maximum value among $|R_1(k)|_{max}$–$|R_N(k)|_{max}$. On the other hand, when the shifted frequency $f_n$ is away from the actual frequency offset $\Omega$ by a certain frequency, the absolute value result $|R_n(k)|$ will appear noise-like without an obvious maximum value, therefore the maximum value $|R_n(k)|_{max}$ among the absolute value result $|R_N(k)|$ will not be the maximum value among all maximum values $|R_1(k)|_{max}$–$R_N(k)|_{max}$. For an illustration of this, please refer to FIG. 3, which is an exemplary diagram of absolute values results $|R_1(k)|$–$|R_3(k)|$. In this embodiment, a channel function $h(k)$ is indicated by the following equation:

$$h(k)=\delta(k)+\delta(k-10)\cdot j \tag{6}$$

Figure 3:
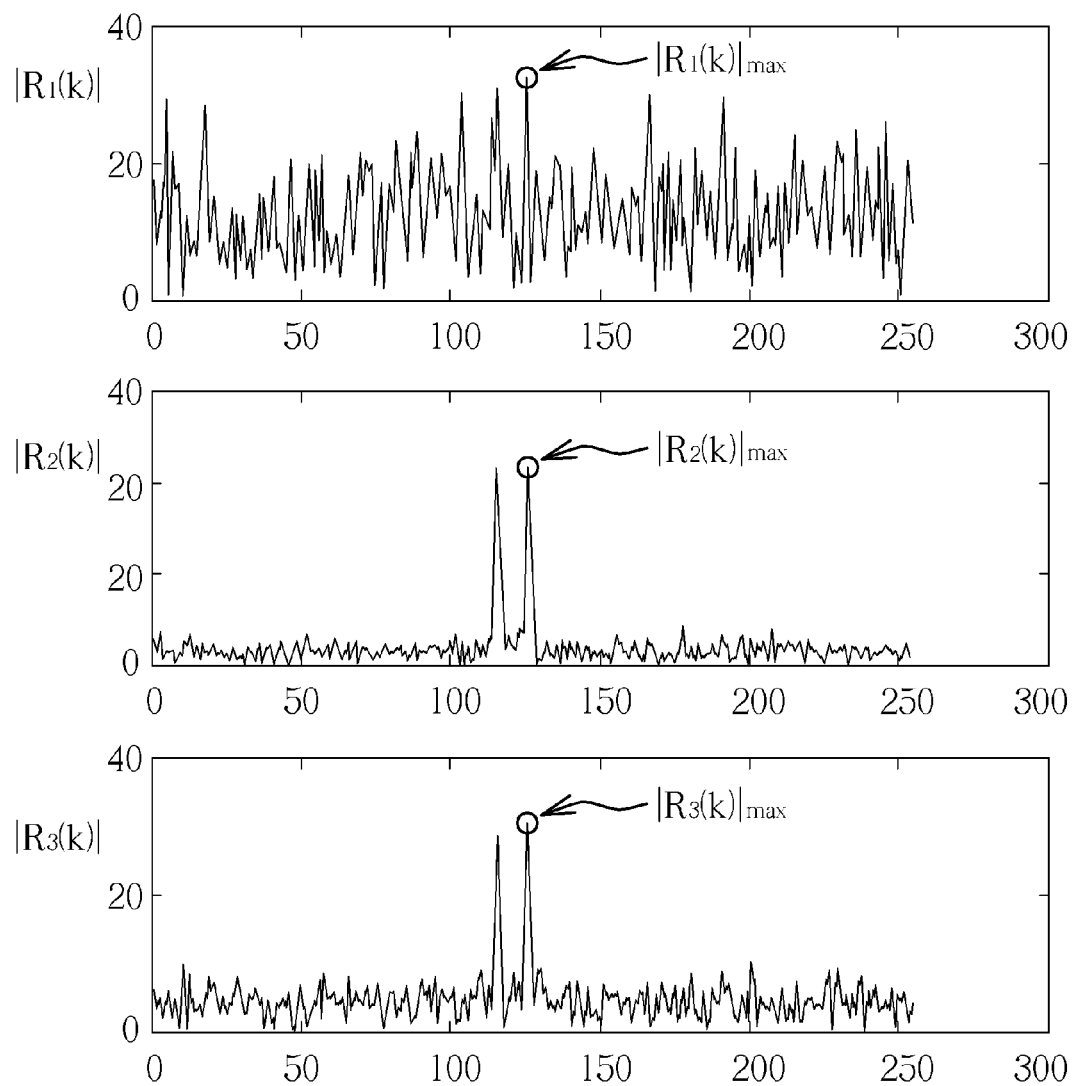
FIG. 3 is an exemplary diagram of absolute value results $|R_1(k)|-|R_3(k)|$ generated from a determining unit in FIG. 1.

In equation (6), $\delta(k)$ and $\delta(k-10)$ are both impulse functions. The length K of the specific sequence signal r(k) is 255, the actual frequency offset $\Omega$ is 10 kHz, and the frequency offsets $f_1$-$f_3$ shifted by the processing unit 110 are –30 kHz, 0 Hz and 30 kHz, respectively. The determining unit 115 generates absolute value results $|R_1(k)|$–$|R_3(k)|$ according to the frequency shifted sequence signals corresponding to the frequency shifts $f_1$-$f_3$ (as shown in FIG. 3); the maximum value $|R_2(k)|_{max}$ of the absolute value result $|R_2(k)|$ is the maximum value among $|R_1(k)|_{max}$–$|R_3(k)|_{max}$, therefore, the frequency offset acquisition apparatus 100 derives a preliminary frequency offset being zero. In another example, if the frequency offset between the transmitter and the receiver falls within a range of ±300 kHz, the processing unit 110 within the frequency offset acquisition apparatus 100 can utilize 30 kHz as an unit of frequency offset to generate different frequency shifted sequence signals with an error range of ±15 kHz; in other words, the preliminary frequency shift can be derived by executing steps 210-220 in FIG. 2 for only 21 times, i.e., the predetermined number of execution can be designed as 21.

Figure 4:
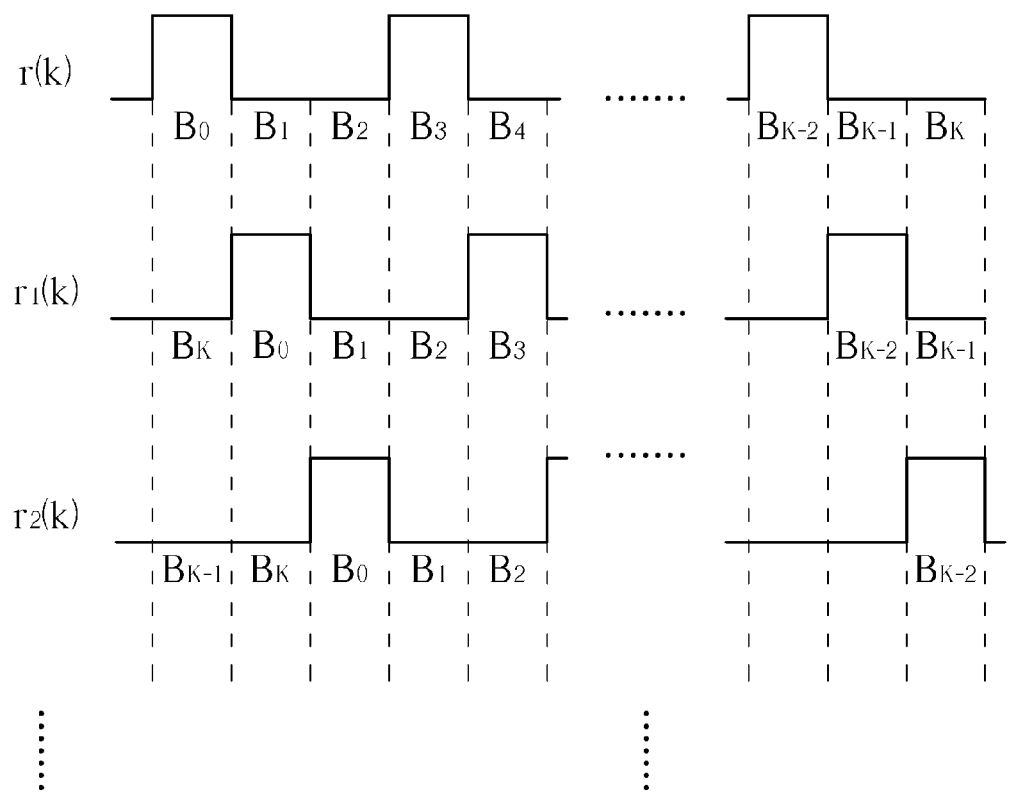
FIG. 4 is an exemplary diagram of a plurality of frequency shifted sequence signals generated by a processing unit in FIG. 2.

FIG. 4 is an exemplary diagram of a plurality of frequency shifted sequence signals generated by the processing unit 110 in FIG. 2. In this embodiment, the processing unit 110 rotates the phase of the specific sequence signal r(k) to generate different frequency shifted sequence signals $r_1(k)$–$r_N(k)$, as shown in FIG. 4. The specific sequence signal r(k) comprises K+1 digits composed of digit "0" and digit "1", i.e., $B_0$–$B_K$, where digit "1" designates a value equal to 1 and digit "0" designates a value equal to –1; for ease of explanation, assume the value of K equal to the value of the aforementioned number of flow execution N, and the processing unit 100 utilizes one digit as a step to rotate the phase of the specific sequence signal r(k), i.e., the digit sequence of the frequency shifted sequence signal $r_1(k)$ is $B_K$, $B_0$–$B_{K-1}$, the digit sequence of the frequency shifted sequence signal $r_2(k)$ is $B_{K-1}$, $B_K$, $B_0$–$B_{K-2}$, the digit sequence of the frequency shifted sequence signal $r_3(k)$ is $B_{K-2}$, $B_{K-1}$, $B_K$, $B_0$–$B_{K-3}$, an so on.

It should be noted that the value of K is not limited to the value of the predetermined number of flow execution N, and the processing unit 110 can also utilize a plurality of digits as a step to rotate the phase of the specific sequence signal r(k). Moreover, utilizing a fixed phase shift as a step to rotate the phase of the specific sequence signal r(k) is not supposed to be a limitation to the present invention; in another embodiment, variant phase shift can also be implemented to rotate the phase of the specific sequence signal r(k).

After deriving the preliminary estimated frequency offset value generated in the first phase, the calibrating unit 120 will utilize the preliminary estimated frequency offset value to perform a frequency offset calibration or frequency offset compensation upon the specific sequence signal r(k) to reduce the frequency offset of the specific sequence signal r(k), and then performs a detailed frequency offset estimation. Assuming a frequency offset $\Omega$ remains after the preliminary frequency offset calibration/compensation is done, the calibrated sequence signal r'(k) is represented by the following equation:

$$r'(k)=[c(k)*h(k)]\cdot e^{j(\Omega'kT+\theta)}+n(k) \tag{7}$$

Next, the choosing unit 125 chooses a plurality of partial sequence signals among the calibrated sequence signal r'(k), therefore the updating unit 130 can utilize the partial signals (sequence signals having incomplete periods) to derive a detailed estimated frequency offset value. To be more specific, the choosing unit 125 chooses two partial sequence signals among calibrated sequence signal r'(k), wherein the first partial sequence signal $r'(n_1)$ is composed of values of r'(k) where k ranges from 0 to K–m, and the second partial sequence signal $r'(n_2)$ is composed of values of r'(k) where k ranges from m to K. For example, if the calibrated sequence signal r'(k) is composed of a plurality of digits $B_0'$-$B_K'$ sequentially, the partial sequence signal $r'(n_1)$ is composed of a plurality of digits $B_0'$-$B_{K-m}'$ sequentially, and the partial sequence signal $r'(n_2)$ is composed of a plurality of digits $B_m'$-$B_K'$ sequentially; in other words, the parameter k is an integer no larger than K and no smaller than zero, $n_1$ is an integer no larger than K–m and no smaller than zero, $n_2$ is an integer no larger than K and no smaller than K–m, K is an integer, and the parameter m is a predetermined value, e.g., K is 255 and m is 64; however, this is not supposed to be a limitation to the present invention.

The updating unit 130 then updates the estimated frequency offset according to the first partial sequence signal $r'(n_1)$, the second partial sequence signal $r'(n_2)$ and the original sequence signal c(k). In detail, in the aforementioned operation of the first phase, the determining unit 115, for example, determines that $|R_n(k')|$ among the absolute value results $|R_n(k)|$ is the maximum value among all maximum values $|R_1(k)|_{max}$–$|R_N(k)|_{max}$, i.e., the value $|R_n(k')|$ is the aforementioned specific absolute value and the correlation value $R_n(k')$ corresponding to $|R_n(k')|$ is generated from the cyclic correlation operation of the original sequence signal c(k) and the frequency shifted sequence signal $r_n(k)$, wherein the value k is an integer no smaller than zero and no larger than the value K. The updating unit 130 refers to the reference point k' to perform a cyclic correlation operation upon the aforementioned partial sequence signals (i.e., the first partial sequence signal $r'(n_1)$ and the second partial sequence signal $r'(n_2)$) and the original sequence signal c(k) to thereby generate a plurality of corresponding operation results $R_{left}(k')$ and $R_{right}(k')$, and then updates the estimated frequency offset according to the first operation result $R_{left}(k')$ and the second operation result $R_{right}(k')$. The first and the second operation result $R_{left}(k')$ and $R_{right}(k')$ can be represented by the following equations:

$$R_{left}(k') = \sum_{n=0}^{K-m} r'(n)\cdot c*(n-k') \cong h'(k') + n_1(k') \tag{8}$$

$$R_{right}(k') = \sum_{n=m}^{K} r'(n)\cdot c*(n-k') \cong h'(k')\cdot e^{j\Omega'mT+\theta} + n_2(k') \tag{9}$$

It can be seen from above equation (8) and equation (9) that the first operation result $R_{left}(k')$, generated from the cyclic correlation of the first partial sequence signal $r'(n_1)$ and the original sequence signal c(k), is close to a function value h'(k') plus a noise component $n_1$(k'), and the second operation result $R_{right}$(k'), generated from the cyclic correlation of the second partial sequence signal r'($n_2$) and the original sequence signal c(k), is close to a function value h'(k') multiplied by $e^{j\Omega'mT+\theta}$ and plus a noise component $n_2$(k'); therefore, the updating unit 130 derives a result value by taking a conjugate value of the first operation result $R_{left}$(k') and then multiplying the conjugate value with the second operation result $R_{right}$(k'), and then directly performs an argument operation upon the result value according to the predetermined value m to derive a final estimated frequency offset. The detailed frequency offset can be represented by the following equation:

$$\hat{\Omega}' = \frac{1}{mT}\arg(R_{right}(k') \cdot R_{left}(k')^*) \qquad (10)$$

The final estimated frequency offset is the preliminary estimated frequency offset plus the detailed estimated frequency offset. Please note that, to derive a more accurate estimation, the value m can be adjusted according to whether the sequence signal is adopted in a practical implementation and the required accuracy.

Figure 5:
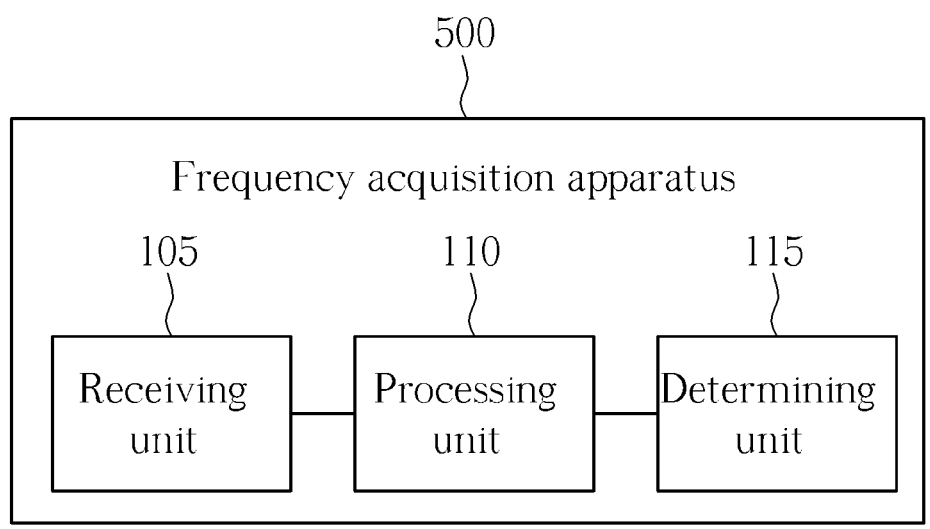
FIG. 5 is a block diagram of a frequency offset acquisition apparatus according to a second embodiment of the present invention.

In addition, in a second embodiment, the aforementioned operation of the second phase can be discarded, i.e., the detailed frequency offset estimation can be skipped. Please refer to FIG. 5, which is a block diagram of a frequency offset acquisition apparatus 500 according to a second embodiment of the present invention. As shown in FIG. 5, the frequency offset acquisition apparatus 500 comprises the aforementioned receiving unit 105, the processing unit 110, and the determining unit 115, but does not include the calibrating unit 120, the choosing unit 125 and the updating unit 130. In other words, the frequency offset acquisition apparatus 500 performs only the preliminary frequency offset estimation without executing the following detailed frequency offset estimation. As the functions and operations of the receiving unit 105, the processing unit 110, and the determining unit 115 are described in the paragraphs above, further explanation is omitted here for brevity.

To summarize, an advantage of the present invention lies in effectively estimating a preliminary frequency offset value in a multipath communication environment, and deriving a detailed estimated frequency offset accurately. Therefore, the present invention is able to solve the problem of the conventional frequency offset estimation failing to be employed in a multipath communication environment.

Those skilled in the art will readily observe that numerous modifications and alterations of the device and method may be made while retaining the teachings of the invention.

What is claimed is:

1. A frequency offset acquisition method, comprising:
receiving a specific sequence signal transmitted through a channel, and storing the specific sequence signal in a storage unit;
performing a plurality of frequency shifting operations upon the same and entire specific sequence signal by respectively shifting the same and entire specific sequence signal by a plurality of different frequencies in frequency domain, thereby generating a plurality of shifted sequence signals, respectively; and
determining an estimated frequency offset value between a transmitter and a receiver according to the plurality of shifted sequence signals.

2. The method of claim 1, wherein the step of determining the estimated frequency offset value according to the plurality of shifted sequence signals comprises:
performing a correlation operation upon an original sequence signal and each shifted sequence signal to generate a plurality of operation results, respectively; and
determining the shifted sequence signal according to the plurality of operation results;
wherein the original sequence signal is outputted to the channel by the transmitter, and the original sequence signal corresponds to the specific sequence signal.

3. The method of claim 2, wherein the original sequence signal is a pseudorandom noise sequence signal.

4. The method of claim 2, wherein the step of performing the correlation operation upon the original sequence signal and each shifted sequence signal to generate the plurality of operation results comprises:
for each shifted sequence signal, performing a cyclic correlation operation upon the original sequence signal and the shifted sequence signal to generate an operation result including a plurality of correlation values; and
the step of determining the estimated frequency offset value according to the plurality of operation results comprises:
performing an absolute value operation upon the plurality of correlation values included in each operation result to generate a plurality of corresponding absolute values, and choosing a specific absolute value among the plurality of absolute values, wherein the specific absolute value is an extreme value among the plurality of absolute values; and
determining the estimated frequency offset value according to an extreme value among a plurality of specific absolute values which correspond to the plurality of operation results, respectively.

5. The method of claim 4, further comprising:
utilizing the estimated frequency offset value to perform a frequency offset calibration upon the specific sequence signal to generate a calibrated sequence signal;
choosing a plurality of partial sequence signals among the calibrated sequence signals; and
updating the frequency offset value according to the plurality of partial sequence signals and the original sequence signal.

6. The method of claim 5, wherein a correlation value corresponding to the specific absolute value is generated from a cyclic correlation operation of the original sequence signal and the shifted sequence signal according to a reference point, and the step of updating the frequency offset value comprises:
performing the cyclic correlation operation of the original sequence signal and the shifted sequence signal according to the reference point, respectively, thereby generating a plurality of corresponding operation results; and
updating the frequency offset value according to the plurality of operation results.

7. The method of claim 5, wherein the step of choosing the plurality of partial sequence signals among the calibrated sequence signals comprises:
choosing a first partial sequence signal r'(n1) and a second partial sequence signal r'(n2) among the preliminarily calibrated sequence signal r'(k);
wherein k is an integer no larger than K and no smaller than zero, n1 is an integer no larger than K-m and no smaller than zero, n2 is an integer no larger than K and no smaller than K-m, K is an integer, and the parameter m is a predetermined value.

8. The method of claim 1, wherein the step of determining the estimated frequency offset value between the transmitter and the receiver according to the plurality of shifted sequence signals comprises:

referring to the plurality of shifted sequence signals, and determining the estimated frequency offset value between the transmitter and the receiver both complying with a time domain synchronous orthogonal frequency division multiplexing (TDS-OFDM) specification.

9. A frequency offset acquisition apparatus, comprising:
a receiving unit, configured to receive a specific sequence signal transmitted through a channel,
a processing unit, coupled to the receiving unit, and configured to perform a plurality of frequency shifting operations upon the same and entire specific sequence signal by respectively shifting the same and entire specific sequence signal by a plurality of different frequencies in frequency domain, thereby generating a plurality of shifted sequence signals, respectively; and
a determining unit, coupled to the processing unit, and configured to determine an estimated frequency offset value between a transmitter and a receiver according to the plurality of shifted sequence signals.

10. The apparatus of claim 9, wherein the determining unit performs a correlation operation upon an original sequence signal and each shifted sequence signal to generate a plurality of operation results, respectively, and determines the shifted sequence signal according to the plurality of operation results; the original sequence signal is outputted to the channel by the transmitter; and the original sequence signal corresponds to the specific sequence signal.

11. The apparatus of claim 10, wherein the original sequence signal is a pseudo random noise sequence signal.

12. The apparatus of claim 10, wherein for each shifted sequence signal, the determining unit performs a cyclic correlation operation upon the original sequence signal and the shifted sequence signal to generate an operation result including a plurality of correlation values; for each operation result, the determining unit performs an absolute value operation upon the plurality of correlation values included in each operation result to generate a plurality of corresponding absolute values, and chooses a specific absolute value among the plurality of absolute values, where the specific absolute value is an extreme value among the plurality of absolute values; and the determining unit determines the estimated frequency offset value according to an extreme value among a plurality of specific absolute values which correspond to the plurality of operation results, respectively.

13. The apparatus of claim 12, further comprising:
a calibration unit, coupled to the determining unit, and configured to utilize the estimated frequency offset value to perform a frequency offset calibration upon the specific sequence signal to generate a calibrated sequence signal;
a choosing unit, coupled to the calibration unit, and configured to choose a plurality of partial sequence signals among the calibrated sequence signals; and
an updating unit, coupled to the choosing unit, and configured to update the frequency offset value according to the plurality of partial sequence signals and the original sequence signal.

14. The apparatus of claim 13, wherein a correlation value corresponding to the specific absolute value is generated by the determining unit performing a cyclic correlation operation upon the original sequence signal and the shifted sequence signal according to a reference point; and the updating unit performs the cyclic correlation operation of the original sequence signal and the shifted sequence signal according to the reference point, respectively, to thereby generate a plurality of corresponding operation results, and updates the frequency offset value according to the plurality of operation results.

15. The apparatus of claim 13, wherein the choosing unit chooses a first partial sequence signal $r'(n1)$ and a second partial sequence signal $r'(n2)$ among the preliminarily calibrated sequence signal $r'(k)$, where k is an integer no larger than K and no smaller than zero, n1 is an integer no larger than K-m and no smaller than zero, n2 is an integer no larger than K and no smaller than K-m, K is an integer, and the parameter m is a predetermined value.

16. The apparatus of claim 13, wherein the specific sequence signal complies with a time domain synchronous orthogonal frequency division multiplexing specification.

17. A frequency offset acquisition apparatus, comprising:
a receiving unit, configured to receive a specific sequence signal transmitted through a channel,
a processing unit, coupled to the receiving unit, and configured to shift a frequency of the specific sequence signal at a plurality of different frequencies in frequency domain to thereby generate a plurality of shifted sequence signals, respectively;
a determining unit, coupled to the processing unit, and configured to determine an estimated frequency offset value between a transmitter and a receiver according to the plurality of shifted sequence signals;
a calibration unit, coupled to the determining unit, and configured to utilize the estimated frequency offset value to perform a frequency offset calibration upon the specific sequence signal to generate a calibrated sequence signal;
a choosing unit, coupled to the calibration unit, and configured to choose a plurality of partial sequence signals among the calibrated sequence signals; and
an updating unit, coupled to the choosing unit, and configured to update the frequency offset value according to the plurality of partial sequence signals and the original sequence signal.

18. The method of claim 1, wherein each of the plurality of shifted sequence signals is generated by shifting a same frequency on the same and entire specific sequence signal.

19. The apparatus of claim 9, wherein each of the plurality of shifted sequence signals is generated by the processing unit by shifting a same frequency on the same and entire specific sequence signal.

* * * * *